United States Patent
Kazakevich et al.

(10) Patent No.: US 7,130,662 B2
(45) Date of Patent: Oct. 31, 2006

(54) SIMPLE SMART-ANTENNA SYSTEM FOR MUD-ENABLED CELLULAR NETWORKS

(75) Inventors: Leonid Kazakevich, Plainview, NY (US); Rui Yang, Greenlawn, NY (US); Alexander Reznik, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 437 days.

(21) Appl. No.: 10/331,073

(22) Filed: Dec. 27, 2002

(65) Prior Publication Data
US 2004/0023691 A1    Feb. 5, 2004

Related U.S. Application Data

(60) Provisional application No. 60/400,109, filed on Aug. 1, 2002.

(51) Int. Cl.
H04B 1/38 (2006.01)
H04M 1/00 (2006.01)

(52) U.S. Cl. .......... 455/562.1; 455/63.1; 455/63.2; 455/561

(58) Field of Classification Search .......... 455/562, 455/562.1, 423, 550.1, 39, 63.1, 63.2, 561; 342/359, 372, 377, 383, 357.1
See application file for complete search history.

(56) References Cited

U.S. PATENT DOCUMENTS

| | | | |
|---|---|---|---|
| 6,192,256 B1 * | 2/2001 | Whinnett | 455/562.1 |
| 6,252,548 B1 * | 6/2001 | Jeon | 342/383 |
| 6,473,036 B1 * | 10/2002 | Proctor, Jr. | 342/372 |
| 6,738,020 B1 * | 5/2004 | Lindskog et al. | 342/377 |
| 6,782,277 B1 * | 8/2004 | Chen et al. | 342/359 |
| 6,839,573 B1 * | 1/2005 | Youssefmir et al. | 455/562.1 |
| 2002/0109631 A1 | 8/2002 | Li et al. | |
| 2003/0048800 A1 | 3/2003 | Kilfoyle et al. | |
| 2003/0104808 A1 * | 6/2003 | Foschini et al. | 455/423 |
| 2003/0171134 A1 * | 9/2003 | Doi et al. | 455/550.1 |
| 2003/0206577 A1 * | 11/2003 | Liberti, Jr. et al. | 375/152 |
| 2004/0104839 A1 * | 6/2004 | Velazquez et al. | 342/357.1 |
| 2004/0162021 A1 * | 8/2004 | Seki et al. | 455/39 |

FOREIGN PATENT DOCUMENTS

EP    1 117 197 A2    7/2001

\* cited by examiner

Primary Examiner—Edan Orgad
Assistant Examiner—Tuan H. Nguyen
(74) Attorney, Agent, or Firm—Volpe and Koenig, P.C.

(57) ABSTRACT

A "smart antenna" method and system for use in cellular networks where the wireless transmit receive unit and/or the base station utilize multi-user detection (MUD). The interference to and from other users is taken into consideration to maximize the desired signal while eliminating or reducing interfering signals, thereby increasing overall system capacity.

12 Claims, 3 Drawing Sheets

SIMPLE SMART-ANTENNA SYSTEM FOR MUD-ENABLED CELLULAR NETWORKS

CROSS REFERENCE TO RELATED APPLICATION

This application claims priority from U.S. provisional application No. 60/400,109, filed on Aug. 1, 2002, which is incorporated by reference as if fully set forth.

BACKGROUND OF THE INVENTION

The present invention is related to "smart antenna" systems. More particularly, the invention is directed to a "smart antenna" system for use in cellular networks where the wireless transmit/receive unit and/or the base station utilize multi-user detection (MUD).

A smart-antenna system generally refers to a composition of several transmit and/or receive antenna elements together with a signal processing protocol which utilizes these antennas to improve the quality of signal reception and the capacity of the cellular networks.

Smart antennas have been widely studied and have been shown to have high potential for performance improvement. A major drawback of most current smart antenna technologies, however, is the significant complexity required to provide more than a marginal improvement in performance. This problem is exacerbated in systems that also utilize multi-user detection (MUD) techniques. Further, current smart antenna techniques only maximize the received power at each WTRU and do not deal with interference to and from other users.

SUMMARY

The present invention discloses a "smart antenna" method and system for use in cellular networks where the wireless transmit receive unit (WTRU) and/or the base station utilize multi-user detection (MUD). The present invention places the interference to and from the other users into consideration to maximize the desired signal while eliminating or reducing interfering signals. Therefore, the overall system capacity can be increased.

DETAILED DESCRIPTION OF THE PREFERRED EMBODIMENTS

Figure 1:
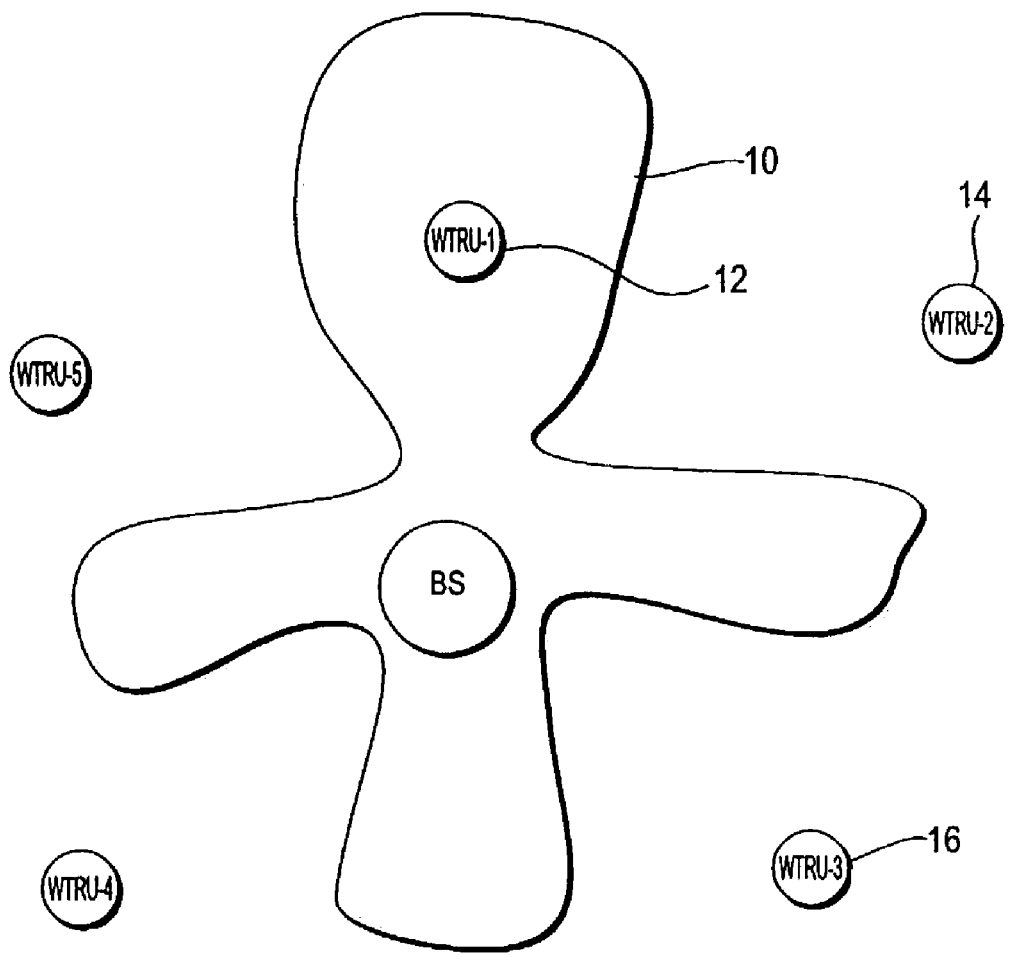
FIG. 1 shows a cellular area with an isolated region of coverage area associated with a single WTRU in accordance with the present invention.

The present invention will be described with reference to the drawing figures wherein like numerals represent like elements throughout. The general approach described herein is applicable to both transmitter and receiver processing with some modification. In both cases, a beam pattern is created for each user such that the power of the signal received from or transmitted to the direction of the desired user is much stronger than the power of the signal received from or transmitted to the directions of the other users.

FIG. 1 shows a beam pattern 10 that is dedicated to a single wireless transmit receive unit (WTRU), WTRU-1 12. The signals transmitted to or received from WTRU-1 12 is emphasized in its own area and de-emphasized in other areas. Therefore, the overall signal-to-noise ratio to or from WTRU-1 12 is improved. It is also apparent from FIG. 1 that the coverage areas area can be fairly complex. In situations with many WTRUs, it is unlikely that each WTRU's signal will be completely isolated, however, even partial isolation can provide significant improvement in signal-to-noise ratios.

The technique shown in FIG. 1 is known as "beamforming" when applied to the transmitted signal, and is known as "smart antenna reception" when applied to the received signal. Performance advantages of this technique include: 1) a low number of antennas needed, such as three (3) for an omni-direction coverage area or possibly less when the coverage area is already directional such as sector of a cell; 2) low-complexity processing; and 3) processing that is compatible with MUD techniques at the receiver.

Figure 2:
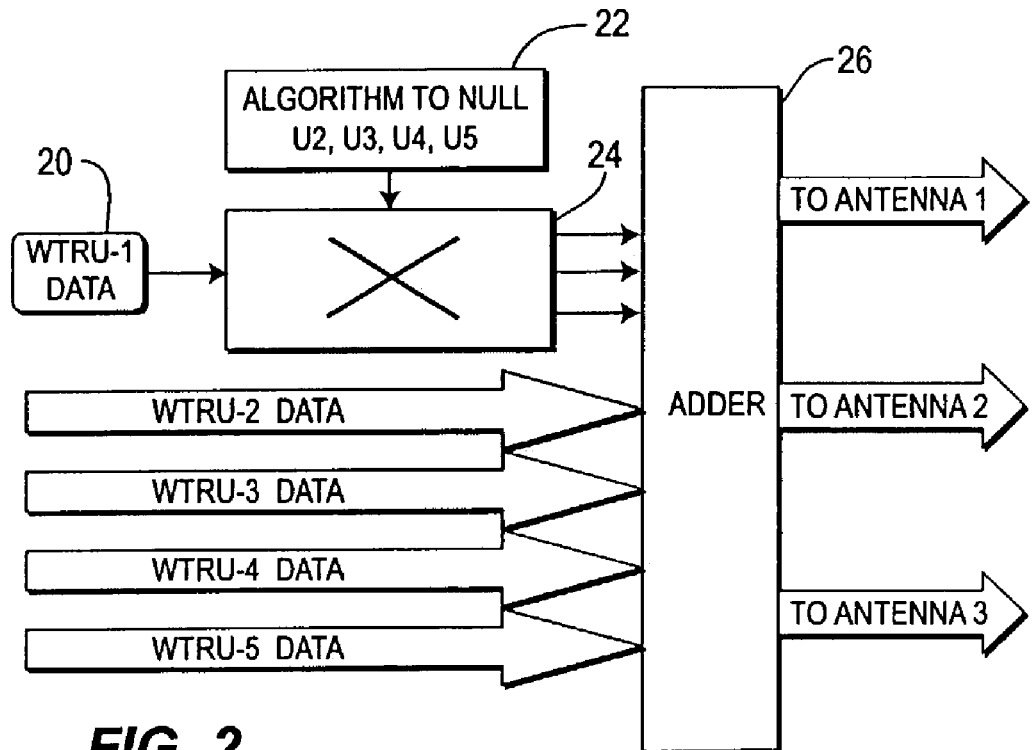
FIG. 2 shows a logical block diagram of a simple smart antenna process for a transmitter in accordance with the present invention.
Figure 3:
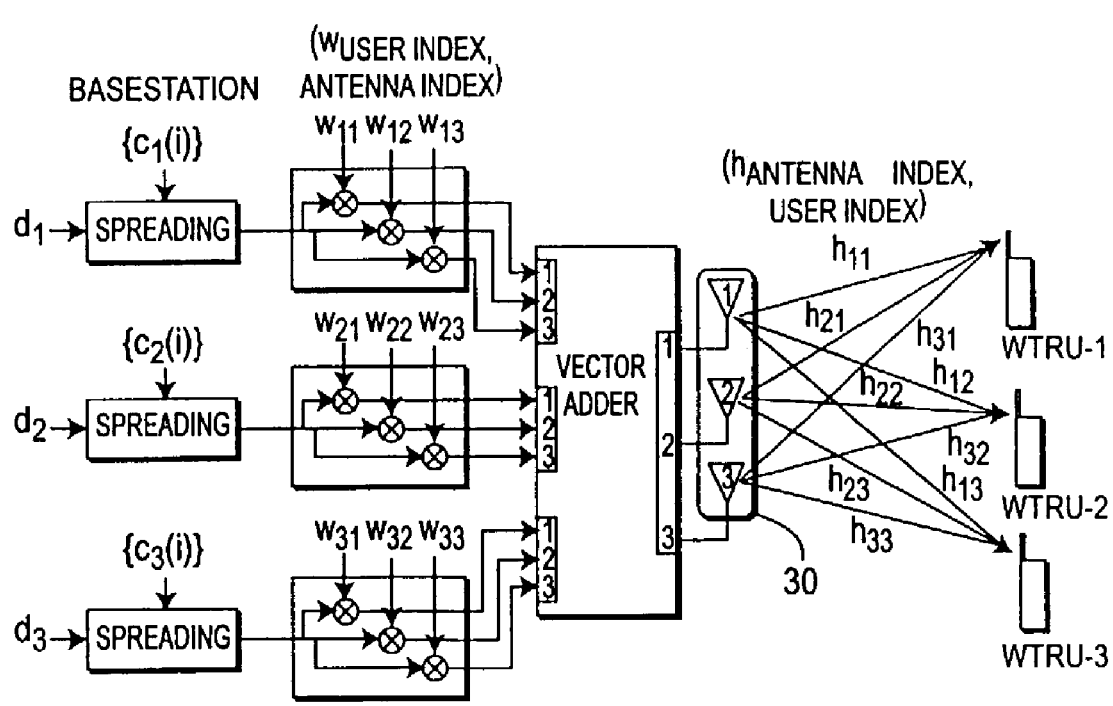
FIG. 3 shows a physical block diagram of a simple smart antenna process for a transmitter in accordance with the present invention.

A logical block diagram of a system at the transmitter for processing signals to be transmitted is shown in FIG. 2. Although this block diagram concentrates on processing the signal for a single WTRU, such as WTRU-1 12, similar structures are implemented for each WTRU. As shown in FIGS. 2 and 3, the signal for WTRU-1 is linearly processed in a way to de-emphasizes its contribution in the direction of the other WTRUs, or other groups of WTRUs by the introduction of one or more nulls. In the case of WTRU-1, the WTRU-1 data 20 would be processed with the nulls for WTRU-2 through WRTU-5 22 in the linear processor 24. Once the processing is complete, the signal for WTRU-1 is added to similarly processed signals in the Adder 26 with the signals for the other WTRUs. The signals are then transmitted out through antenna array 30.

FIG. 3 is a physical block diagram for implementing the architecture of FIG. 2. For simplicity only three WTRU's are considered. The antenna complex weights, $\{w_{i,j}\}$, where i is the index of designed user and j is the index of the antenna, are computed to generate nulls which remove or reduce interference and maximize the composite channel power gain for a desired user (WTRU).

The goal is to maximize the received power for the desired user WTRU-1 12 and minimize the interference power to the other users WTRU-2 14 and WRTU-3 16. Mathematically, assuming the index of the desired user is 1, the antenna weights may be calculated using Equation 1:

$$\max_{w_i} \frac{w_i^H R_i w_i}{w_i^H \overline{R}_i w_i} \text{ subject to } |w_i| = 1 \text{ for } i = 1,2,3; \quad \text{Equation 1}$$

where $R_i = H_i^H H_i$ and $H_i = [h_{1i}\ h_{2i}\ h_{3i}]$, $h_{ij}$ is channel impulse response from antenna i to user j, and $$\overline{R}_i = \sum_{k \ne i} R_k.$$

Equation 1 can be optimized as shown in Equation 2:

$$R_i w_i = \lambda_{imax} \overline{R}_i w_i; \quad \text{Equation 2}$$

where $\lambda_{imax}$ is generalized eigenvalue of matrix pair $(R_i, \overline{R}_i)$. It should be noted that this method is very different from the TxAA (Transmit Adaptive Arrays) method used in the current 3GPP standard. The TxAA scheme only maximizes the received power at the WTRU and has no concern about the interference to the other users. Since the approach of the present invention takes the interference to other users into consideration, the overall system capacity can be increased.

Figure 4:
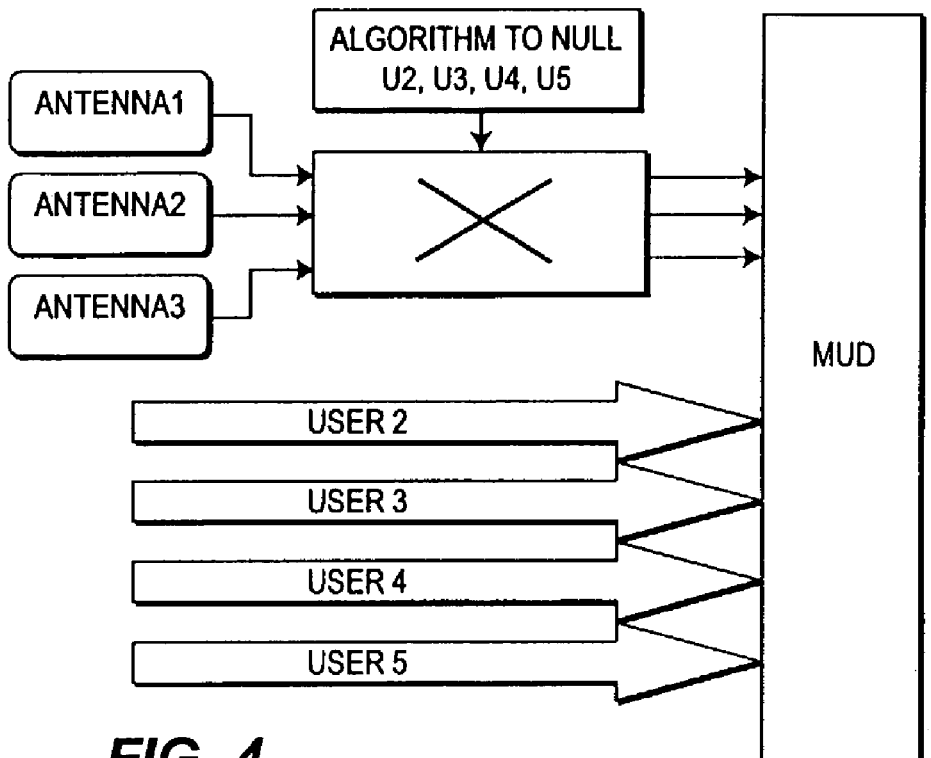
FIG. 4 shows a logical block diagram of a simple smart antenna process for a receiver in accordance with the present invention.
Figure 5:
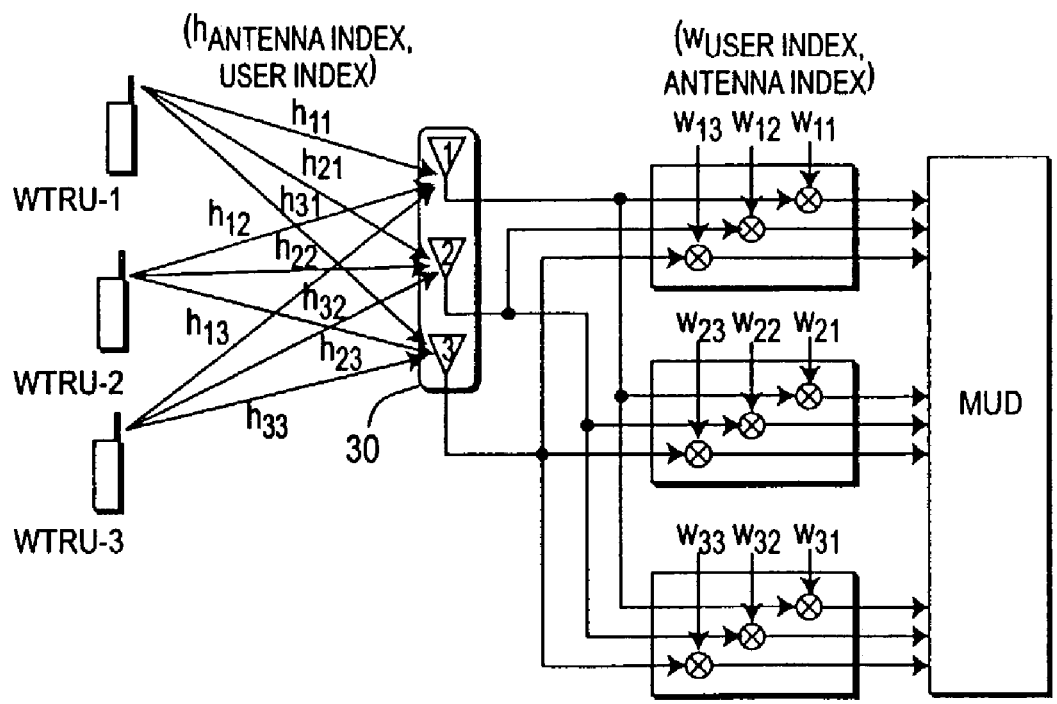
FIG. 5 shows a physical block diagram of a simple smart antenna process for a receiver in accordance with the present invention.

A similar structure is implemented for the receiver side of the processing, as shown in the logical and physical block diagrams in FIGS. 4 and 5, respectively. The major differences between the transmitter and receiver processing are that: 1) the antenna weights are selected to maximize the desired signal power and minimize the interference from the other users; and 2) the smart antenna processing is followed by a multi-user detection (MUD) processor which will combine the inputs from different antennas for each user internally.

It is assumed, however, that the channel impulse responses are the same in both downlink and uplink directions, and therefore the complex antenna weights in one direction, downlink or uplink, can be applied to the other direction, uplink or downlink.

As with any smart antenna application in a cellular environment, it is preferable to implement the present invention at both the Node B transmitter and at the Node B receiver to provide the maximum performance advantage. As described with reference to Equations 1 and 2, the present inventive method requires that the channel impulse responses at each of the antennas be known. While perfect knowledge of channel impulse responses is typically not available, a very accurate response estimate of the channel impulse response for each WTRU at each antenna is typically obtained in the course of normal receiver processing. Various standard non-smart-antenna prior art methods can be utilized for the purpose of obtaining such an estimate.

Deriving the channel impulse responses for the transmitter, (i.e., the impulse responses of the channels from the Node B transmit antennas to the WTRUs), in frequency-division duplex (FDD) systems can be a problem since different frequency bands are used for downlink and uplink transmissions. Thus, it may be difficult to implement the transmitter portion of the present invention in such systems.

However, in time-division duplex (TDD) systems, the same frequency band is time shared between the uplink and the downlink. This permits the use of the channel impulse response estimates obtained from the transmissions received in the uplink for the downlink. Difficulty may arise in TDD with the integrity of the channel impulse response estimates some number of time slots after they are obtained. However, in many TDD systems, such as the TDD mode of the proposed UMTS W-CDMA standard, the time-slot duration is short enough so that for channels with slow fading such as for indoor and pedestrian-type applications, the channel estimates remain valid for one or more time slots. Such slow fading channels are typical in micro-cellular and pico-cellular environments. The present invention is, therefore, particularly well adapted to these environments.

An even more effective application is in a cellular network having a multi-cellular environment that utilizes a MUD-type receiver. In such networks, the performance of the receivers is often limited primarily by the inter-cell interference between Node Bs and also between WTRUs located in neighboring cells. For example, where linear MUDs are utilized, the effective signal-to-interference ratio (SIR) at the output of the MUD for de-correlating/zero-forcing types of receivers is given by the Equation 3:

$$SIR_{eff}^{dc} = \frac{1}{\sigma^2 H_{kk}^+}; \quad \text{Equation 3}$$

where $H_{kk}^+$ is the [k,k] element of $H^{-1}$; H is a matrix that is determined by inter-cell configuration and environment, such as user signature sequences, data rates and channel conditions; and $\sigma^2$ is the total power due to thermal noise and inter-cell interference. Except in very large cells, the inter-cell interference accounts for essentially all of the $\sigma^2$ value. The effective SIR at the output of the MUD for minimum-mean square error (MMSE) at the receiver is illustrated by Equation 4:

$$SIR_{eff}^{MMSE} = \frac{|([H+\sigma^2 I]^{-1} H)_{kk}|^2}{\sigma^2 |([H+\sigma^2 I]^{-1} H[H+\sigma^2 I]^{-1})_{kk}| + \sum_{\substack{l=1 \\ l \ne k}}^{K} |([H+\sigma^2 I]^{-1} H)_{kl}|^2}; \quad \text{Equation 4}$$

where I is identity matrix with the same dimensions as H.

From Equations 3 and 4, as $\sigma^2$ approaches zero, the SIR goes to infinity. Thus, reduction of inter-cell interference is a primary concern for a MUD-enabled network. The cross-interference between intra-cellular terms can be completely corrected by a MUD if the $\sigma^2$ term becomes infinite. This is unlike networks with RAKE and matched-filter based receivers, where intra-cellular interference is also important. The value for $\sigma^2$ is comprised of inter-cell interference, thermal channel noise and the noise introduced from the receiver processing. Of these components, the inter-cell interference is typically the major contributor. Therefore, reducing the inter-cell interference has the greatest effect on significantly reducing the overall interference power as measured by $\sigma^2$.

Inter-cell interference is particularly large in TDD systems where Node-Bs significantly interfere with reception by WTRUs located at cell edges. Similar interference is commonplace in micro-cellular and pico-cellular systems where the cell sizes are small. The present invention is ideally suited to reduction of inter-cell interference in such an environment. By selectively aiming transmissions at WTRUs or groups of WTRUs in their cells, the Node Bs significantly reduce the total amount of energy emitted in any particular direction, thus reducing the total inter-cell interference. By limiting the angle range from which energy is collected at the receiver, a Node B limits the interference from other cells that contribute to any single WTRU receiver's input signal. The resulting performance improvement can be significant. For example, halving the inter-cell interference into a decorrelating receiver improves the performance by 3 dB. Similar gains are obtained from the MMSE receivers.

It shall be understood by those of skill in the art, that the present invention is ideally suited to reduce inter-cell interference, especially where the base stations interfere significantly with reception by the WTRUs located at or near the cell's edge by selectively aiming transmissions at each of the the WTRUs. The number of antenna weights, the number of generated complex weights and the number of transmitting and receiving antenna may be implemented, as desired, without departing from the spirit and the scope of the invention.

Although particular processing functions have been described as being performed by particular components, it should be understood that performance of processing functions may be distributed among network components as desired.

Although the present invention has been described in detail, it is to be understood that the invention is not limited thereto, and that various changes can be made therein without departing from the spirit and scope of the invention, which is defined by the attached claims.

What is claimed is:

1. A method for reducing inter-cell interference between WTRUs and multi-user detection (MUD)-enabled base stations comprising:

storing at each base station, a set of channel impulse response data for each of a plurality of WTRUs;

selecting at least two planar points in a cell as locations of interference for each of said plurality of WTRUs;

determining a set of complex antenna weights from said set of channel impulse response data and said planar points for each WTRU which maximizes a signal at each of said plurality of WTRUs while nulling said signal at all other WTRUs; such that the antenna weights are represented as $\{w_{i,j}\}$, where i is the index of designed user and j is the index of the antenna, channel impulse response $R_i$ calculated as $R_i=H_i^H H_i$, where $H_i=[h_{1i}\ h_{2i}\ h_{3i}]$, and $h_{ij}$ is a channel impulse response from antenna i to user j, the antenna weights calculated as $$\max_{w_i} \frac{w_i^H R_i w_i}{w_i^H \overline{R}_i w_i}$$

subject to $|w_i|=1$ for i=1,2, ... N, and $$\overline{R}_i = \sum_{k \neq i} R_k;$$

and applying said antenna weights to create partitioning of said cell, where each WRTU's signal is emphasized in its own area and deemphasized in other areas.

2. The method of claim 1 wherein said set of channel impulse response data is determined by the base station and the WTRU.

3. The method of claim 1 in which an downlink to the WTRU comprises the set of antenna weights selected to maximize the power of desired signal and minimize the interference to the other users and cells.

4. The method of claim 1 in which an uplink to the WTRU comprises the set of antenna weights selected to maximize the power of desired signal and reduce interference from the other users and cells.

5. The method of claim 1 wherein the channel response data for a downlink channel and an uplink channel are the same, the set of antenna weights is then selected from either the downlink or the uplink set of antenna impulse responses.

6. The method of claim 1, wherein the smart antenna has at least three antenna elements for both signal transmission and receiving.

7. A base station for wireless communications with a plurality of N WTRUs, the base station comprising:

a plurality of smart antennas configured to transmit and receive data associated with N WTRUs;

a receiver comprising:
a multi-user detection (MUD) processor;

a transmitter comprising:
first through Nth linear processors, each associated with a respective first through Nth WTRU, each linear processor receiving data for transmission to its associated WTRU, each linear processor configured to perform vector calculations to maximize signal power intended for transmission to its associated WTRU and minimize unintended interference signal power to the other WTRUs, each linear processor configured to calculate complex weights represented as $\{w_{i,j}\}$, where i is the index of designed user and j is the index of the antenna, channel impulse response $R_i$ calculated as $R_i=H_i^H H_i$, where $H_i=[h_{1i}\ h_{2i}\ h_{3i}]$, and $h_{ij}$ is a channel impulse response from antenna i to user j, the antenna weights calculated as $$\max_{w_i} \frac{w_i^H R_i w_i}{w_i^H \overline{R}_i w_i}$$

subject to $|w_i|=1$ for i=1,2, ... N, and $$\overline{R}_i = \sum_{k \neq i} R_k;$$

and a vector adder for combining the data processed by first through Nth linear processors, the combined data suited for transmission across the plurality of antennas.

8. The base station of claim 7 wherein the number of antennas is three.

9. The base station of claim 7, wherein the antenna weight calculation is optimized by: $R_i w_i = \lambda_{imax} \overline{R}_i w_i$, where $\lambda_{imax}$ is a generalized eigenvalue of matrix pair $(R_i, \overline{R}_i)$.

10. A base station for wireless communications with a plurality of N WTRUs, the base station comprising:

a plurality of smart antennas configured to receive data associated with N WTRUs in communication with the base station;

a receiver comprising:
first through Nth linear processors, each associated with a respective first through Nth WTRU, each linear processor receiving data from its associated WTRU, each linear processor configured to perform vector calculations to maximize signal power received from its associated WTRU and minimize unintended interference signal power received from the other WTRUs, each linear processor configured to calculate complex weights represented as $\{w_{i,j}\}$, where i is the index of designed user and j is the index of the antenna: channel impulse response $R_i$ calculated as $R_i=H_i^H H_i$, where $H_i=[h_{1i}\ h_{2i}\ h_{3i}]$, and $h_{ij}$ is the channel impulse response from antenna i to user j, and the antenna weights calculated as $$\max_{w_i} \frac{w_i^H R_i w_i}{w_i^H \overline{R}_i w_i}$$

subject to $|w_i|=1$ for $i=1,2,\ldots N$, and $$\overline{R}_i = \sum_{k \neq i} R_k;$$

and
a multi-user detection (MUD) processor configured to combine the data processed by first through Nth linear processors, for reconfiguring the data of each WTRU received by the plurality of antennas.

11. The base station of claim 10 wherein the number of antennas is three.

12. The base station of claim 10, wherein the antenna weight calculation is optimized by: $R_i w_i = \lambda_{imax} \overline{R}_i w_i$, where $\lambda_{imax}$ is a generalized eigenvalue of matrix pair $(R_i, \overline{R}_i)$.

* * * * *

UNITED STATES PATENT AND TRADEMARK OFFICE
CERTIFICATE OF CORRECTION

| | | |
|---|---|---|
| PATENT NO. | : 7,130,662 B2 | Page 1 of 1 |
| APPLICATION NO. | : 10/331073 | |
| DATED | : October 31, 2006 | |
| INVENTOR(S) | : Kazakevich et al. | |

It is certified that error appears in the above-identified patent and that said Letters Patent is hereby corrected as shown below:

Title page, item (56), FOREIGN PATENT DOCUMENTS, page 1, right column, after "EP 1 117 197 A2 7/2001", insert --JP 09-036638 2/1997
KR 2002-0051095 6/2002--.

At column 2, line 37, after the words "a way to", delete "de-emphasizes" and insert therefor --de-emphasize--.

At column 2, line 41, after the word "through", delete "WRTU-5" and insert therefor --WTRU-5--.

At column 2, line 48, after the word "three", delete "WTRU's" and insert therefor --WTRUs--.

At column 2, line 56, after "14 and", delete "WRTU-3" and insert therefor --WTRU-3--.

At claim 3, column 6, line 4, after the word "which", delete "an" and insert therefor --a--.

Signed and Sealed this

Twenty-second Day of May, 2007

JON W. DUDAS
*Director of the United States Patent and Trademark Office*